Patented Nov. 12, 1940

2,221,478

UNITED STATES PATENT OFFICE 2,221,478

PRODUCTION OF GUANIDINE SALTS

William H. Hill, Stamford, Robert C. Swain, Riverside, and Joseph H. Paden, Glenbrook, Conn., assignors to American Cyanamid Company, New York, N. Y., a corporation of Maine No Drawing. Application October 31, 1939, Serial No. 302,136

17 Claims. (Cl. 260—501)

This invention relates to a method of preparing guanidine salts from cyanamide and dicyandiamide as starting materials. Objects of the invention are to provide an efficient method for the production of guanidine salts which is general in its application and can be used to prepare a guanidine salt of any desired acid.

Guanidine thiocyanate is now prepared by fusing cyanamide or dicyandiamide with dry ammonium thiocyanate by the method described by Werner and Bell in the Journal of the Chemical Society, 1920, pages 1133–1136. Guanidine nitrate and guanidine sulfate have also been prepared according to this method, using ammonium nitrate and ammonium sulfate respectively. Further work of the authors noted above has shown (JCS 1922, pages 1790–1794) that the reaction can also be used to produce alkyl substituted guanidines by fusing dicyandiamide with alkyl ammonium chloride. It is not possible, however, to prepare guanidine carbonate by these methods, nor can they be readily applied in the preparation of guanidine salts of other weak acids or of acids forming ammonium salts which fuse at high temperatures.

We have now discovered that guanidine salts of any desired acid, either organic or inorganic, can be prepared by heating a dispersion of cyanamide or dicyandiamide in the presence of liquid ammonia if the acid radical of the desired salt is present to combine with the guanidine when it is formed. The salt-forming radical may be present as the free acid or its anhydride, or in the form of an ammonium salt, or as a salt of any other base weaker than the guanidine or substituted guanidine to be formed, or in any other form in which it is capable of combining with guanidine to form a stable guanidine salt.

It is known that melamine is formed when cyanamide or dicyandiamide is heated at reaction temperatures in the presence of liquid ammonia. Under these conditions we believe that a part of the cyanamide or dicyandiamide first reacts with the ammonia to form guanidine according to the following reactions:

(1) $N \equiv C.NH_2 + NH_3 \rightarrow HN = C(NH_2)_2$
(2) $H_2N.C(:NH).NHC \equiv N + 2NH_3 \rightarrow$
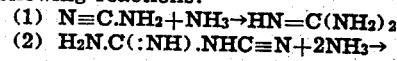$2HN = C(NH_2)_2$ which guanidine combines with more of the starting material to form melamine with regeneration of the ammonia by the reactions (3) $HN = C(NH_2)_2 + 2N \equiv C.NH_2 \rightarrow C_3N_6H_6 + NH_3$
(4) $HN = C(NH_2)_2 + H_2N.C(:NH).NH.C \equiv N \rightarrow$
$C_3N_6H_6 + NH_3$ We believe that when cyanamide or dicyandiamide is heated with anhydrous ammonia in the presence of an acid radical the radical binds the guanidine as a stable guanidine salt in such a manner that it is no longer free to combine with further amounts of cyanamide or dicyandiamide to form melamine or other cyanamide polymerization products. Apparently guanidine and substituted guanidines in the nascent state are extremely reactive bases and will combine preferentially with even the weakest acids to form stable salts instead of combining with cyanamide or dicyandiamide. Of course, the radicals of the stronger acids such as hydrochloric acid, sulfuric acid, nitric acid, maleic acid, acetic acid and the like will combine more readily with guanidine and substituted guanidines than will the weaker acid radicals such as those of carbonic acid, carbamic acid, higher fatty acids, benzoic acid, anthranilic acid and the like. We have found, however, that reasonably good yields of guanidine salts can be obtained from the radicals of even the weakest acids, such as carbonic and carbamic acids if the proper conditions are observed. Since the guanidine salts of such weak acids are the most difficult to prepare, we have devoted the greater number of the following examples to their methods of preparation, and have given only a few illustrations of the preparation of guanidine salts of the stronger acids such as guanidine acetate and hydrochloride, but it should be understood that the reaction is perfectly general and that the methods we have illustrated can be applied in preparing the guanidine salt of any acid.

In applying the principles of our invention for the production of guanidine salts a pressure vessel should be used, for the range of reaction temperatures may be as much as 200° C. or higher. In most cases the reaction starts at 80–100° C., but is much more rapid at higher temperatures, and a temperature range of 120–160° C. appears to be the optimum. However, the conversion of dicyandiamide is quite rapid at the higher temperature ranges, and it should be understood that our invention in its broader aspects includes the formation of guanidine salts at any desired reaction temperature at which the salt will remain in a stable condition.

While the process of our invention may be carried out in the presence of any salt-forming radical capable of combining with guanidine to form a stable guanidine salt, we prefer to add this radical as an ammonium salt. Thus, in the preparation of guanidine sulfate or guanidine nitrate a mixture of dicyandiamide, anhydrous ammonia and an excess of ammonium sulfate or ammonium nitrate may be heated at 140-160° C. for two to four hours, and good yields of the corresponding guanidine salt will be obtained. In the preparation of guanidine salts of the weaker acids, such as guanidine carbonate or guanidine carbamate, we also prefer to add the salt-forming radical in the form of ammonium carbonate or ammonium carbamate.

In some cases, and particularly when the salt-forming radical is added as an acid anhydride such as acetic anhydride, phthalic anhydride, $CO_2$, $P_2O_5$, $NO_2$ and the like, as well as when using commercial ammonium carbonate which contains ammonium carbamate and ammonium bicarbonate, it is necessary or advisable to add a small amount of water or an aqueous diluent to the reaction mixture. This water addition facilitates or enables the radical of a dehydrated or anhydrous acid to form a guanidine salt in cases where it would not be reactive in the absence of water. It should be understood, therefore, that the terms "anhydrous ammonia" and "liquid ammonia" are not intended to exclude the presence of small amounts of water added for this purpose, but that these terms are used to distinguish from ammonium hydroxide which does not give comparable results. It is also frequently of advantage to add other diluents to the anhydrous ammonia such as methyl alcohol, ethyl alcohol, benzyl alcohol, ethylene glycol, dioxane or hydrocarbons such as toluol and similar substances which will aid in the dispersion of the reaction mixture and reduce the pressure in the autoclave during the heating cycle.

In general, the ammonium salts of monobasic acids such as hydrochloric acid, acetic acid, propionic acid, butyric acid, other fatty acids, benzoic acid and the like, are soluble in anhydrous liquid ammonia, which is also a solvent for cyanamide and dicyandiamide. The ammonium salts of the polybasic acids, however, such as ammonium sulfate, ammonium phthalate, ammonium maleate, ammonium carbonate and the like as well as the ammonium salts of higher fatty acids such as lauric and stearic acids are of more limited solubility in anhydrous ammonia and the addition of non-aqueous diluents to the reaction mixture is frequently useful for the purpose of retaining these materials in liquid form during the heating period. Similarly, the addition of non-aqueous diluents may be resorted to when it is desired to obtain the reaction product as a fluid mixture after the heating cycle is completed for many of the guanidine salts, such as guanidine carbonate, are obtained as a precipitate from the anhydrous ammonia. On the other hand, such compounds as guanidine acetate are completely soluble in liquid ammonia and a precipitant therefor, such as dioxane, may be included in the reaction mixture to obtain the product directly in solid form if desired.

In practicing the process of our invention, an excess of the acid radical corresponding to the desired guanidine salt is preferably employed. When dicyandiamide is used as the starting material we prefer to use from 2 to 4 moles of the ammonium salt of a monobasic acid, or from 1 to 2 moles of the ammonium salt of a dibasic acid, for each mole of dicyandiamide. When cyanamide is employed, its molar ratio is of course twice as much. A charge consisting of the two solid ingredients is preferably dissolved or dispersed in a solvent comprising liquid ammonia, either alone or with the addition of non-aqueous diluents and the mixture heated in an autoclave with continuous agitation to keep the solids in suspension during the heating period. After heating the autoclave is preferably cooled and discharged and the ammonia and other volatiles evaporated off if necessary and recovered for reuse in the process. The product usually contains considerable amounts of unreacted ammonium salts and may also contain minor quantities of dicyandiamide and small amounts of urea, melamine, ammeline or other cyanamide polymerization products. The guanidine salt can be recovered from this reaction product in a high state of purity by one or more recrystallizations from solvents such as methyl alcohol, ethyl alcohol and the like.

The invention will be illustrated in greater detail by the following specific examples. It should be understood, however, that although these examples may describe certain of the more specific features of the invention they are given primarily for purposes of illustration and in its broader aspects the invention is not limited thereto.

*Example 1*

336 parts of dicyandiamide and 384 parts of ammonium carbonate were placed in an autoclave having a stainless steel liner and provided with heating coils and an agitator. The autoclave was then closed and 630 parts by weight of liquid ammonia were introduced. The autoclave was heated to 120° C. during 45-60 minutes by passing a suitable heating medium through the heating coils, and maintained at 120° C. for four hours. The autoclave was then quickly cooled to room temperature during about 10-15 minutes by circulating water through the cooling coils, gases were vented until the pressure was atmospheric, and the autoclave was opened.

The charge from the autoclave was air-dried to constant weight and analyzed for guanidine and dicyandiamide. Its dry weight was 76% of the solids charged into the autoclave, the loss in weight being due primarily to evaporation of ammonium carbonate or ammonium carbamate on drying. Analysis showed the product to contain 53.7% of guanidine expressed as the carbonate, and thus an overall yield of 41% of the theoretical yield was obtained, based on the amount of dicyandiamide charged. The percentage yield in this and subsequent examples is expressed as percent of theory; that is to say, based on the production of two moles of guanidine for each mole of dicyandiamide charged. 23.7% of unreacted dicyandiamide was found in the product.

*Example 2*

336 parts by weight of dicyandiamide and 480 parts of commercial ammonium carbonate were heated in 390 parts of liquid ammonia to which 72 parts of water had been added. The heating was carried out in the autoclave described in Example 1, which was brought up to 140° C. and maintained at this temperature for four hours. The pressure in the autoclave at this temperature was 1120 pounds per square inch. The autoclave was then cooled and the product obtained as described in Example 1.

A 68% recovery of total solids was obtained which were found to contain 72.7% of guanidine carbonate and 1.56% of dicyandiamide. This amounts to an overall yield of 56% of the theoretical.

Upon a single recrystallization of the product from dilute ethyl alcohol a guanidine carbonate of 90–95% purity was obtained.

*Example 3*

336 parts by weight of dicyandiamide and 384 parts of commercial ammonium carbonate were heated in an autoclave with 200 parts of liquid ammonia containing 600 parts of ethyl alcohol for one hour at 140° C. A total solids recovery of 43% was obtained upon evaporating off the ammonia and alcohol. This product contained 46.8% of guanidine expressed as the carbonate, which represented an overall yield of 28%.

*Example 4*

455 parts by weight of dicyandiamide and 420 parts of ammonium carbamate were heated with 655 parts of liquid ammonia in the autoclave described in Example 1 for five hours at 120° C. Upon evaporation of the ammonia 83% of the total solids charged were recovered in the form of a product analyzing 47.5% expressed as guanidine carbonate, representing an overall yield of 35%. Upon completion of the heating it was found that the entire product was dissolved in the liquid ammonia, which indicated that it was guanidine carbamate rather than guanidine carbonate.

*Example 5*

455 parts of dicyandiamide were charged into an autoclave containing 415 parts of liquid ammonia and 460 parts of anhydrous methanol. 240 parts by weight of carbon dioxide were introduced in the form of dry ice, after which the autoclave was closed and heated at 120° C. for two hours. Upon evaporation of the ammonia and filtering a total solids recovery of 52% was obtained, the product containing 20.6% of guanidine expressed as guanidine carbonate. In a second run 336 parts of dicyandiamide and 384 parts of ammonium carbonate were heated in 120 parts of liquid ammonia containing 600 parts of 80% ethyl alcohol—20% water mixture, the contents of the autoclave being brought up to 140° C. and maintained at this temperature for two hours. Very little insoluble material was obtained from this run, although small amounts of guanidine carbonate were found in the product. A considerable evolution of heat was noted during the reaction, due to the small amount of ammonia present.

*Example 6*

252 parts by weight of dicyandiamide and 384 parts of ammonium carbonate were charged into an autoclave containing 250 parts of anhydrous liquid ammonia and 600 parts of ethyl alcohol. The charge was heated for two hours at 160° C., a total pressure of 630 pounds per square inch being developed. An insoluble precipitate was obtained which amounted to 48% of the total solids charged and which was found to contain 57% of guanidine carbonate and no unreacted dicyandiamide. The overall yield from this precipitate was therefore 32%.

In another run 336 parts of dicyandiamide and 576 parts of ammonium carbonate were heated for two hours at 160° C. in 405 parts of anhydrous ammonia, without addition of alcohol. The internal pressure of the autoclave was 1400 pounds per square inch, but a 68% recovery of a solid product analyzing 52.2% guanidine carbonate and no dicyandiamide was obtained. This amounted to an overall yield of 45% of theory, and a guanidine carbonate of 93% purity was obtained by one recrystallization from alcohol and water. A comparison of this and the preceding example indicates that while alcohols or other organic solvents or diluents may be used to reduce the total pressure in the autoclave the yield of solid reaction product is lowered and higher temperatures must be resorted to.

*Example 7*

336 parts of dicyandiamide and 384 parts of commercial ammonium carbonate were charged into an autoclave containing 390 parts of liquid anhydrous ammonia to which 50 parts of water had been added. The charge was heated for one hour at 150° C., during which time a pressure of 1440 pounds per square inch was noted in the autoclave. A solid product amounting to 82% of the solids charged was recovered upon evaporating off the ammonia and water. This product analyzed 70% of guanidine carbonate and 4% unreacted dicyandiamide, thus showing a yield of 57% of theory.

In another run a charge of the same type was heated for one-half hour at 160° C. at a pressure of 1720 pounds per square inch. A 72% recovery of total solids was obtained analyzing 60% guanidine carbonate and 1.2% unreacted dicyandiamide. It is evident from these two runs that the conversion of dicyandiamide can be carried to completion in much less time at higher temperatures; the only limiting factor appearing to be the autoclave pressure.

*Example 8*

336 parts by weight of dicyandiamide and 616 parts of ammonium acetate were dissolved in 480 parts of liquid ammonia in the autoclave described in Example 1, which was then closed and heated at 160° C. for two hours. After the autoclave was cooled and vented it was found that the reaction product was completely dissolved in the liquid ammonia to a clear solution. The ammonia was therefore evaporated off and the solid product was dried in air. As it contained substantial amounts of hygroscopic ammonium acetate it was dried to constant weight under a vacuum before analysis.

The vacuum dried product amounted to 92% of the total solids charged and analyzed 77.1% guanidine acetate and 1.5% of unreacted dicyandiamide. Upon a single recrystallization from an alcohol-water mixture a guanidine acetate of 99% purity was obtained. The results obtained constituted a 71% overall yield, based on the dicyandiamide charged.

*Example 9*

336 parts by weight of dicyandiamide and 616 parts of ammonium acetate were dissolved in a mixture of 190 parts of liquid anhydrous ammonia and 500 parts of dioxane. The mixture was heated for two hours at 160° C. under a pressure of 560 pounds per square inch. After evaporation of the ammonia a solid product amounting to 78% of the total solids charged was filtered off from the dioxane. This was found to contain 77.1% of guanidine acetate and 2.7% of unreacted dicyandiamide. A 60% yield was therefore obtained.

*Example 10*

252 parts of dicyandiamide and 462 parts of ammonium acetate were dissolved in a mixture of 280 parts of anhydrous liquid ammonia and 600 parts of ethyl alcohol. The mixture was heated three hours at 160° C. under a total pressure of 630 pounds per square inch whereupon 41% of the total solids charged were recovered from the alcohol after evaporating off the ammonia. The product was recrystallized from alcohol and on analysis was found to be 99% pure.

*Example 11*

336 parts by weight of dicyandiamide and 428 parts of ammonium chloride were dissolved in 325 parts of anhydrous liquid ammonia and heated for four hours at 128° C. under a pressure of 825 pounds per square inch. The resulting guanidine hydrochloride was obtained as a solution in the liquid ammonia, which was evaporated off and the solids were dried in air. The solid product amounted to 98% of the total solids charged to the autoclave; it contained no unreacted dicyandiamide and was a guanidine hydrochloride of 96% purity. Further purification by recrystallization was therefore unnecessary.

*Example 12*

336 parts of dicyandiamide and 428 parts of ammonium chloride were dissolved in 480 parts of anhydrous liquid ammonia and heated for two hours at 160° C. in an autoclave, the pressure of which was 1410 pounds per square inch. Upon evaporating off the ammonia 98% of the total solids were recovered as a product containing 91% of guanidine hydrochloride and no unreacted dicyandiamide.

*Example 13*

192 parts by weight of dry cyanamide analyzing 94% CN.NH₂ and 366 parts of ammonium nitrate were dissolved in 450 parts of anhydrous liquid ammonia and heated for two hours at 160° C., the pressure developed being 1400 pounds per square inch. The autoclave was then cooled and vented in the usual manner and the ammonia evaporated from the charge.

The crude product after drying contained 92.4% of guanidine nitrate and a substantially pure product was obtainable by a single recrystallization from an alcohol-benzol mixture.

*Example 14*

126 parts by weight of cyanamide of 98.2% purity was dissolved with 231 parts of ammonium acetate in 480 parts of anhydrous liquid ammonia. The mixture was heated for two hours at 120° C., cooled, and the ammonia evaporated off. The resulting product contained 63.3% of guanidine acetate.

What we claim is:

1. A method of preparing a guanidine salt which comprises heating, at a temperature between 80° C. and the decomposition temperature of the guanidine salt and under the corresponding autogenic pressure, a dispersion of a member of the group consisting of cyanamide and dicyandiamide in a solvent comprising essentially liquid ammonia in the presence of an anion capable of combining with guanidine to form a stable guanidine salt.

2. A method of preparing a guanidine salt which comprises heating in a closed vessel to 100–200° C. a dispersion of a member of the group consisting of cyanamide and dicyandiamide in a solvent comprising essentially liquid ammonia in the presence of an anion capable of combining with guanidine to form a stable guanidine salt.

3. A method of preparing a guanidine salt which comprises heating, at temperatures between 80° C. and the decomposition temperature of the guanidine salt and under the corresponding autogenic pressure, a dispersion of a member of the group consisting of cyanamide and dicyandiamide in a solvent comprising essentially liquid ammonia in the presence of a salt, the anion of which is capable of combining with guanidine to form a stable guanidine salt.

4. A method of preparing a guanidine salt which comprises heating, at temperatures between 80° C. and the decomposition temperature of the guanidine salt and under the corresponding autogenic pressure, a dispersion of a member of the group consisting of cyanamide and dicyandiamide in a solvent comprising essentially liquid ammonia in the presence of an ammonium salt the anion of which is capable of combining with guanidine to form a stable guanidine salt.

5. A method of preparing a guanidine salt which comprises heating, at temperatures between 80° C. and the decomposition temperature of the guanidine salt and under the corresponding autogenic pressure, a dispersion of a member of the group consisting of cyanamide and dicyandiamide in a solvent comprising essentially liquid ammonia and a diluent in the presence of an anion capable of combining with guanidine to form a stable guanidine salt.

6. A method of preparing a guanidine salt which comprises heating, at temperatures between 80° C. and the decomposition temperature of the guanidine salt and under the corresponding autogenic pressure, a dispersion of a member of the group consisting of cyanamide and dicyandiamide in a solvent comprising essentially liquid ammonia and a diluent in the presence of an ammonium salt the anion of which is capable of combining with guanidine to form a stable guanidine salt.

7. A method of preparing a guanidine salt of a weak acid which comprises heating, at temperatures between 80° C. and the decomposition temperature of the guanidine salt and under the corresponding autogenic pressure, a dispersion of a member of the group consisting of cyanamide and dicyandiamide and an ammonium salt of said weak acid in a solvent comprising essentially liquid ammonia and a small amount of water.

8. A process according to claim 4 in which the ammonium salt is formed in situ by charging an acid anhydride and water with an excess of the liquid ammonia used in the reaction.

9. A method of preparing a guanidine salt which comprises heating, at temperatures between 80° C. and the decomposition temperature of the guanidine salt and under the corresponding autogenic pressure, a dispersion of a member of the group consisting of cyanamide and dicyandiamide in a solvent comprising essentially liquid ammonia and a saturated alcohol in the presence of an anion capable of combining with guanidine to form a stable guanidine salt.

10. A method of preparing guanidine carbonate which comprises heating, at temperatures between 80° C. and the decomposition temperature of the guanidine salt and under the corresponding autogenic pressure, a dispersion of ammonium carbonate and a member of the group consisting of cyanamide and dicyandiamide in a solvent comprising essentially liquid ammonia.

11. A method of preparing guanidine carbonate which comprises heating, at temperatures between 80° C. and the decomposition temperature of the guanidine salt and under the corresponding autogenic pressure, a dispersion of ammonium carbonate and a member of the group consisting of cyanamide and dicyandiamide in a solvent comprising essentially liquid ammonia and a saturated alcohol.

12. A process according to claim 10 in which the ammonium carbonate is formed in situ by charging carbon dioxide and water with an excess of the liquid ammonia used in the reaction.

13. A method of preparing guanidine carbonate which comprises heating at temperatures of 140–160° C. a dispersion of a member of the group consisting of cyanamide and dicyandiamide in a solvent comprising essentially liquid ammonia in the presence of ammonium carbonate.

14. A method of preparing guanidine carbonate which comprises heating at temperatures of 140–160° C. a dispersion of a member of the group consisting of cyanamide and dicyandiamide in a solvent comprising essentially liquid ammonia and a saturated aliphatic alcohol in the presence of ammonium carbonate.

15. A method of producing guanidine carbonate which comprises heating, at temperatures between 80° C. and the decomposition temperature of the guanidine salt and under the corresponding autogenic pressure, a dispersion of dicyandiamide and ammonium carbonate in liquid ammonia, the dispersion containing from two to four moles of ammonium carbonate for each mole of dicyandiamide.

16. A method of producing a guanidine salt of a fatty acid which comprises heating, at temperatures between 80° C. and the decomposition temperature of the guanidine salt and under the corresponding autogenic pressure, a dispersion of dicyandiamide in a solvent comprising essentially liquid ammonia in the presence of an excess of an ammonium salt of the fatty acid.

17. A method of producing guanidine acetate which comprises heating, at temperatures between 80° C. and the decomposition temperature of the guanidine salt and under the corresponding autogenic pressure, a dispersion of dicyandiamide and an excess of ammonium acetate in a solvent comprising essentially liquid ammonia.

WILLIAM H. HILL.
ROBERT C. SWAIN.
JOSEPH H. PADEN.